Aug. 31, 1954     H. J. VELTEN ET AL     2,687,645
DIFFERENTIAL PRESSURE FLOW RATE MEASUREMENT DEVICE
Filed March 2, 1950     2 Sheets-Sheet 1

HUBERT J. VELTEN
HERBERT ZIEBOLZ
INVENTORS
BY
ATTORNEYS

Aug. 31, 1954

H. J. VELTEN ET AL 2,687,645

DIFFERENTIAL PRESSURE FLOW RATE MEASUREMENT DEVICE

Filed March 2, 1950

HUBERT J. VELTEN
HERBERT ZIEBOLZ

INVENTORS

BY

ATTORNEYS

Patented Aug. 31, 1954

2,687,645

UNITED STATES PATENT OFFICE 2,687,645

DIFFERENTIAL PRESSURE FLOW RATE MEASUREMENT DEVICE

Hubert J. Velten, Homewood, and Herbert Ziebolz, Chicago, Ill., assignors to Askania Regulator Company, Chicago, Ill., a corporation of Illinois Application March 2, 1950, Serial No. 147,188

3 Claims. (Cl. 73—211)

The present invention relates to flow rate measurement and particularly to structure arranged for interposition in an enclosed flow line and providing an orifice restricting fluid flow in such path for development of a pressure differential that affords a measure of the volume rate of fluid flow in the path.

More specifically, the invention relates to improvement of structure for providing a specialized form of restriction orifice of a type that has been found to be of exceptional value for development of readily measurable pressure differentials in situations where condition of the flow path tend to disturb the smoothly flowing character of fluid stream and thereby prevent development of a steady pressure drop across a conventional center orifice restriction that continuously and accurately represents flow rate. This specialized orifice, the general type of which is previously known, is annular, being formed by a baffle plate smaller than the enclosed flow path and arranged transversely therein. It has previously been found that such a baffle plate, centrally and transversely disposed relative to a flowing stream, and surrounded by an annular orifice between itself and the path-enclosing wall, when disposed in a region of flow conditions that create such stream disturbance as to render useless for flow measurement the conventional center opening orifice, creates adjacent its opposite surfaces regions of pressure sufficiently steady and sufficiently extended up and downstream to permit satisfactory measurement of flow rate by measurement of differential between pressures of such regions.

The arrangement heretofore proposed for orifice-forming structures of this kind has involved supporting the baffle plate upon signal pipes, the plate being attached to the ends of such pipes which extend respectively from the point of plate location up and downstream substantial distances to points of support from the conduit wall at which they enter the interior of the flow-enclosing conduit. The signal pipes in such arrangement have been provided, adjacent their baffle plate-supporting ends and within the steady pressure regions adjacent the baffle plate surfaces, with pressure-admitting ports. Arrangements of this kind, while affording satisfactory orifice performance, has proven extremely inconvenient in assembly and disassembly, requiring attachment to and detachment from the signal pipes of the baffle plate, which requires the assembly or dismantling of an entire section of conduit line in the region of the orifice structure. Additionally, the supposed necessity of supporting the baffle plate on reaches of signal pipe extending axially of the path substantial distances up and downstream from the orifice location has in certain cases defeated the purpose of the arrangement, as when the orifice is to be located too close to an obstruction in the flow path or to an elbow of the conduit to permit the axial disposition of baffle plate-supporting signal pipes.

The present invention avoids these various unsatisfactory or inconvenient characteristics of prior annular orifice-providing structures, by providing a baffle plate arrangement supported directly from the surrounding conduit wall and independently of the signal pipes. The arrangement thereby is such as to be readily insertable or withdrawable from between meeting ends of adjacent conduit sections without disturbance of the signal pipes, and is capable of placement close to disturbance-creating conditions such as conduit elbows or obstructions that prevent axial disposition of substantial reaches of baffle supports in the conduit line. The invention is based on the discovery that satisfactory qualities of a baffle plate centrally disposed in a flow path for developing regions of steady pressures the difference between which accurately measures volume flow rate, are not materially affected by the presence of radial supporting structure extended across the annular orifice defined by such plate, or by radial signal pipes positioned up and downstream of the plate for detecting the magnitudes of pressures of such regions.

A primary object of the invention is the provision of a novel flow-restricting orifice-forming structure arranged to position a baffle plate in a central region of a fluid flow path and substantially surrounded by an orifice opening, and including as supporting means for such plate only structure projecting inward from the surrounding flow path-enclosing conduit wall.

Another object is the provision of a novel assembly arrangement in a flow path enclosed by a conduit, of structure providing a centrally disposed baffle plate and signal pipes having pressure-admitting openings closely adjacent the baffle plate surfaces.

Still another object is the provision of such an orifice-forming structure, wherein the baffle plate is readily replaceable by baffle plates of other sizes to permit change of the cross sectional area of the orifice defined by the structure.

A further object is the provision of such an orifice-forming structure, the arrangement of which is such as to permit ready formation of the orifice-defining margins with bevels, to provide accurate definition of the effective orifice area by sharp edges and downstream tapering away from the flowing stream of the marginal surfaces forming such edges to prevent exertion on the stream of friction effects that have been found to destroy the calculated effect of the orifice area.

Figure 3:
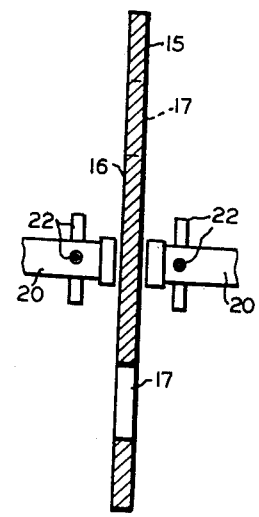
Figure 4:
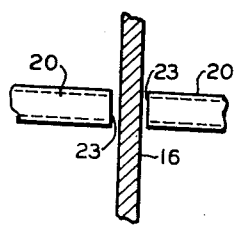

Figs. 3 and 4 respectively are fragmentary median sectional views showing various signal pipe arrangements that may be used with orifice-forming structures arranged in accordance with the invention.

Figure 1:
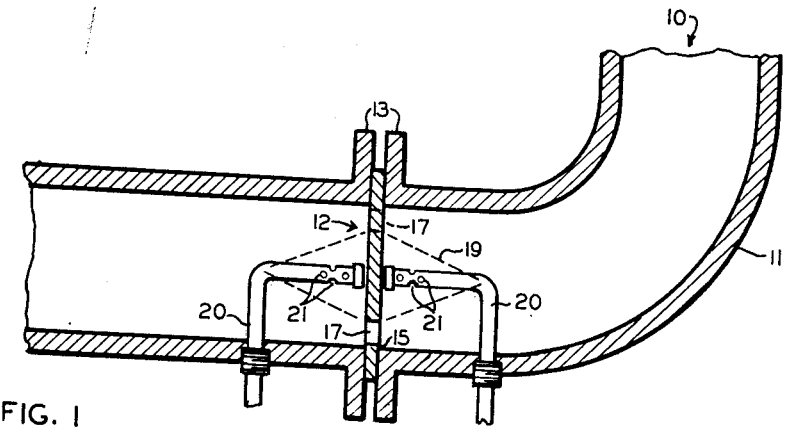
Fig. 1 is a median sectional view through part of a conduit line that encloses a flow path, wherein is mounted a differential pressure-developing and detecting assembly arranged in accordance with the invention.
Figure 5:
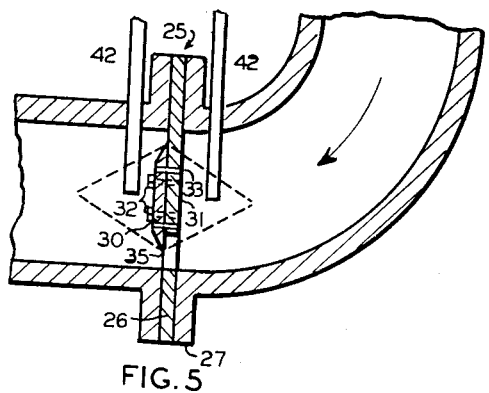

Fig. 5 is a sectional view similar to Fig. 1, showing a more highly developed orifice-forming structural arrangement.

Figure 6:
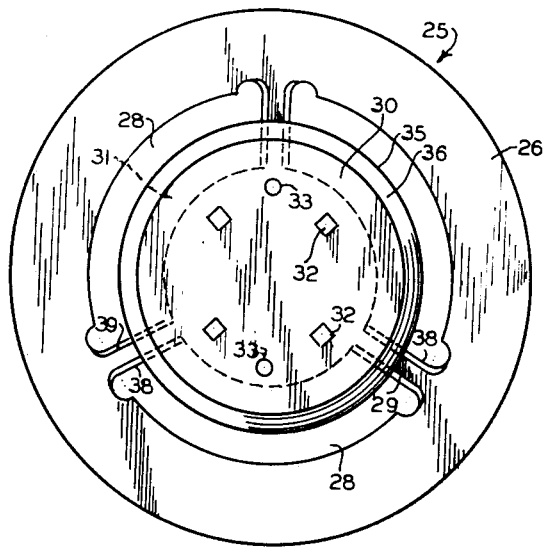

Fig. 6 is a plan of the downstream side of a structure of the arrangement shown by Fig. 5.

Figure 7:
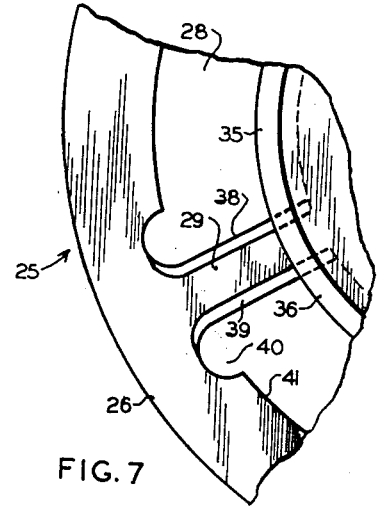

Fig. 7 is an enlarged fragmentary view of such a structure.

Figure 8:
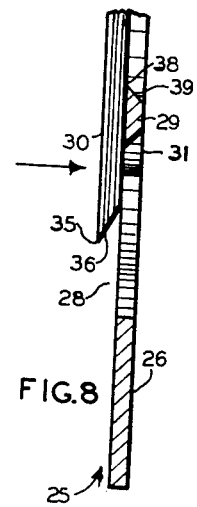

Fig. 8 is a sectional view, corresponding to a section on line 8—8 of Fig. 6 but showing a slightly modified form of the arrangement.

Describing the drawings in detail, and first referring to the more general form of the invention disclosed by Figs. 1 to 4, in Fig. 1 the conduit line 10 is to be considered as so arranged as to produce a disturbed flow condition in a region wherein it is desirable or necessary to measure flow rate by a flow-restricting orifice. The elbow 11 shown in the conduit line is a typical flow-disturbing condition, creating regions of disturbance extending considerable distances both up and downstream, and of such character as to preclude development of a steady and measurable pressure differential across a flow-restricting orifice of conventional center opening type. Other conditions creating similar flow disturbance zones are entrance and exit ends of flow path-enclosing conduit lines, branches, and obstructions in the conduit lines. Experiment and use has demonstrated conclusively that, as set forth above, orifice-forming structures of the centrally disposed baffle plate type here involved are capable of developing steady upstream and downstream pressures, differential between which substantially are proportional to second powers of the flows producing them, as in the case of more conventional orifice structures arranged in regions of ideal stream flow.

The orifice-forming structure of the present invention is preferably flat and relatively thin to permit ready insertion between and withdrawal from between adjacent ends of successive sections of the conduit line enclosing the flow path. As shown in Fig. 1, the orifice plate 12 is secured between flanges 13 at the ends of adjacent sections of the conduit line, the sections being secured together in any conventional manner.

Figure 2:
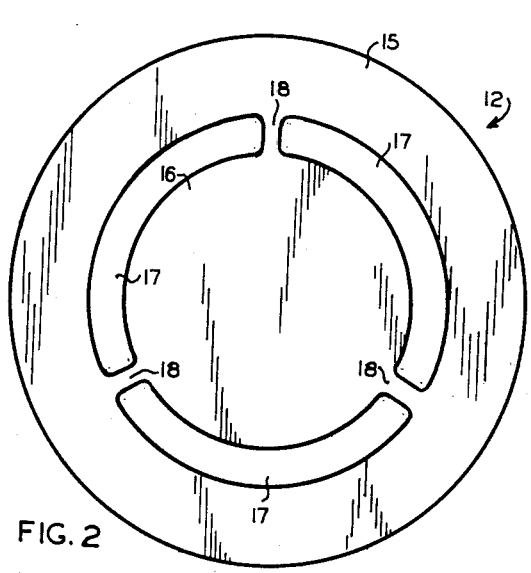
Fig. 2 is a plan of an orifice-forming structure arranged in accordance with the invention.

Referring to Fig. 2, plate 12 comprises a marginal portion 15 for engagement between adjacent conduit section ends. A central baffle plate part 16 is spaced inward from marginal part 15 by a series of orifice-forming openings 17, shown as arcuate and together defining an annular orifice surrounding baffle plate part 16 substantially completely, but interrupted by narrow web parts 18 of the plate, such web parts being attached at their opposite ends to the marginal and baffle plate parts 15, 16.

Again referring to Fig. 1, baffle plate part 16, supported centrally of and transverse to the flow path enclosed by conduit line 10, forms regions of steady pressure at its upstream and downstream sides. The extent and shape of these regions depend somewhat on the size and shape of the baffle plate portion 16 and the size and shape of the orifice-forming openings 17, as well as on the volume rate of flow through such openings, but they appear to extend in somewhat conically tapering form from the margin of the baffle plate to substantial distances up and down stream in the general shape indicated by the dotted lines 19.

Signal pipes for transmitting pressures of the regions of steady pressure indicated by lines 19 may be arranged in a variety of ways, as will appear from the following. In Figs. 1, 3 and 4, such pipes 20 are shown as extended substantially axial of the flow path from points of support located substantial distances from the plate structure. These pipes terminate within the regions of steady pressure developed on opposite sides of the baffle plate part 16 of the assembly, which are indicated by lines 19. Preferably the ends of signal pipes 20 are closely adjacent but out of actual contact with the plate structure. They are provided with pressure-admitting openings which may be arranged in a variety of ways so long as they are disposed within the steady pressure regions. In Fig. 1 the pressure-admitting openings are shown as simple ports 21 distributed axially and circumferentially of the end regions of pipes 20. In Fig. 3 they are shown as stub taps 22, and in Fig. 4 they comprise open ends 25 of pipes 20 themselves.

It is standard practice in flow-measurement by differential pressure developed across a flow-restricting orifice, to bevel the orifice-defining margin of the structure, providing a sharp edge that is disposed on the upstream side of the mounted assembly, the marginal surface downstream of such sharp edge being inclined away from the constricted stream flowing through the orifice. This arrangement permits accurate selection of the magnitude range of pressure differential developed by volume flow rates in a given range. Not only does the sharp edge permit more exact selection of the minimum cross sectional orifice area that it defines, but it also renders such area the effective area of the orifice by substantially eliminating the friction effect upon the stream of marginal parts that are in or approach parallel relation to the direction of flow through the orifice. Such friction effects are difficult if not impossible to predict or select.

Figs. 5 to 8 disclose an embodiment of the invention that includes provision for ready accomplishment of this highly desirable beveling, and also for the desirable additional feature of replaceability of the baffle plate that develops the steady pressure regions in disturbed stream flows and develops a differential between the pressures of such regions. Replacement of the baffle plate of a given installation is desirable for changing the orifice area, for measuring flow rate ranges of different magnitudes occurring at different times or during different types of operation.

As shown in Figs. 5 to 8, the orifice-forming structure comprises a supporting spider 25, having a surrounding annular marginal part 26 for engagement between adjacent ends of successive conduit sections, as the flanges 27 of Fig. 5, and surrounding a series of orifice-forming openings 28 that together form an annular orifice that is interrupted by narrow radial webs 29 that project inward from the marginal part 26. The central baffle plate 30 is a separate part detachably supported by the webs 29, conveniently and as shown, by dismountable attachment to a center part 31 of the spider structure. Advantageously this center part 31 is formed integral with the annular marginal part 26 and the supporting webs 29. Mounting may be accomplished by such means as bolts 32 threaded into the central part 31 of the spider. Dowel pins 33 may be used for accurately positioning the baffle plate 30 on the spider, it being assumed that the spider is arranged for accurate mounting relative to the flow path defined by the surrounding conduit walls, and that clearance openings are provided in the baffle plate 30 for receiving the mounting bolts 32.

The baffle plate 30, in order to accomplish accurate definition of the orifice opening and eliminate adverse effects on calculated pressure differential response range by frictional contact between extended surfaces of the structure and the stream flowing through the orifice, is marginally beveled to provide a sharp edge 35 for upstream disposition in the mounted assembly, and a trailing surface 36 that tapers sharply from such edge in a direction away from the stream flowing through the orifice that the sharp edge defines and from the direction of such edge. Since the side edges of the supporting webs 29 form surfaces partially defining the orifice openings 28, they are also preferably beveled to provide sharp edges 38 for upstream disposition in the mounted assembly, and surfaces 39 that taper inwardly of the webs and away from the path of fluid flowing through the openings 28. To permit ready beveling of the web side edges fully to the margin of the annular outer portion 26, the latter preferably is provided adjacent each web edge with a recess 40 for clearance of a tool beveling the adjacent web surface. These clearance recesses 40 are masked by the conduit line structure when the assembly is mounted with the annular inner surface 41 of the marginal part 26 in registration with the inner surface of the conduit line, as in Fig. 5. The center portion 31 may be provided with recesses similar to recesses 40, or beveling of the side web surfaces may terminate near the margin of part 31, since the inner extremities of the webs and their side surfaces are masked by the baffle plate.

In Figs. 5 to 7, the baffle plate part 30 is shown as mounted on the downstream side of the supporting spider 25, and consequently the sharp edge 35 of the baffle plate 30 is adjacent the downstream surfaces of the webs 29. In Fig. 8 the baffle plate 30 is shown mounted on the upstream side of the spider, and consequently the sharp edge of the baffle plate is on the side away from the spider. In the latter arrangement the sharp edges 38 of the webs 29, again being on the upstream side of the assembly, are adjacent the downstream side of the baffle plate 30.

Fig. 5 discloses a slight modification of the signal pipe arrangement. In such arrangement the signal pipes 42 enter the flow line closely adjacent the orifice-forming structure and project radially from the surrounding conduit wall into the regions of steady pressure, again indicated by dotted lines 19, developed by the baffle plate 30. Preferably, in order to minimize flow disturbance by the radial signal pipes, the latter are arranged parallel to and, so far as possible, masked by one of the supporting webs 29. This arrangement of radial signal pipes entering close to the orifice-forming structure is useful when the orifice assembly must be located so close to a conduit bend or obstruction as to preclude the use of axial signal pipes arranged as in Figs. 1, 3 and 4.

It will be evident from the foregoing that the use of a separate baffle plate, as 30 in Figs. 5 to 8, not only provides the obvious advantage of a readily replaceable orifice-defining member for selection of effective orifice cross-sectional area, but additionally provides for ready manufacturing production of the beveled marginal surfaces that are essential to accurate preselection of the pressure differential magnitude range of response to given flow rate range. While a structure, such as that shown by Figs. 1 to 4, having substantial edge areas extended generally parallel to direction of stream flow will have the usual square law response characteristic, from design of the orifice cross section it practically is impossible to predict the magnitude range of such response characteristic. Thus in commercial production it is regarded as essential to provide the sharp edged beveled orifice-defining surfaces that permit accurate computation of the response range of the orifice.

From the foregoing, the basic concepts of the invention will readily be apparent, and it will be evident that many changes in specific forms of arrangements may be made within the scope of the invention as defined by the appended claims.

We claim:

1. A differential pressure-developing and detecting assembly arranged in a flow path enclosed by a conduit line of preselected internal diameter, comprising a structure defining an annular orifice and including a marginal portion mounted to the wall of said line and having a circular inner periphery of a diameter substantially corresponding to said preselected conduit diameter, a central baffle plate having a substantially circular outer periphery spaced inward from and having a diameter smaller than that of said inner periphery and preselected to provide a baffle plate surface area for obstructing a portion of a percentage of the cross sectional area of said flow path that is predetermined to provide, in a preselected range of volume flow rates of fluid flow in said line and on opposite sides of said structure, different pressures having measurable magnitudes of differentials that respectively are proportional to said rates of flow, and said baffle plate being of sufficient diameter to produce, in a region of turbulent fluid flow, regions of pressure sufficiently stable for measurement of said differentials and which regions respectively are adjacent opposite surfaces and within the bounds of the periphery of said baffle plate; web means attached to said marginal portion and baffle plate, positioning the latter concentric with the inner periphery of the former and thereby defining said annular orifice between their said peripheries, said web means providing a surface area equal to the remainder of said preselected percentage and comprising the sole attachment of said baffle plate to said conduit line; and a pair of signal pipes positioned by the conduit line independently of said structure, said pipes projecting inward from the wall of said conduit line, respectively extending into the different said regions of stable pressures upon opposite sides of said baffle plate, and the inner ends of said pipes being closely adjacent to but free of said structure and spaced apart to permit the latter to be withdrawn radially from between them while they remain positioned by said wall, and said pipes having pressure-admitting openings to their interiors located within the bounds of said baffle plate periphery, in said stable pressure regions and inwardly spaced from said conduit line wall.

2. A differential pressure-developing and detecting assembly arranged in accordance with claim 1, wherein said marginal portion is engaged between the ends of adjacent conduit sections, and said marginal portion and web means have opposite corresponding flat surfaces that are coplanar.

3. A differential pressure-developing and detecting assembly arranged in accordance with claim 1, wherein said marginal portion is engaged between the ends of adjacent conduit sections, said marginal portion and web means have opposite corresponding flat surfaces that are coplanar, and said pipe pressure-admitting openings are adjacent but spaced from the surfaces of said baffle plate.

References Cited in the file of this patent

UNITED STATES PATENTS

| Number | Name | Date |
|---|---|---|
| 2,210,448 | Dodge | Aug. 6, 1940 |
| 2,259,014 | Upperman | Oct. 14, 1941 |
| 2,306,940 | Fischer | Dec. 29, 1942 |

FOREIGN PATENTS

| Number | Country | Date |
|---|---|---|
| 578,878 | Germany | June 19, 1933 |